May 20, 1952   R. R. MOSHER   2,597,527
REVERSIBLE ROTARY FLUID COUPLING
Filed July 13, 1948   2 SHEETS—SHEET 1
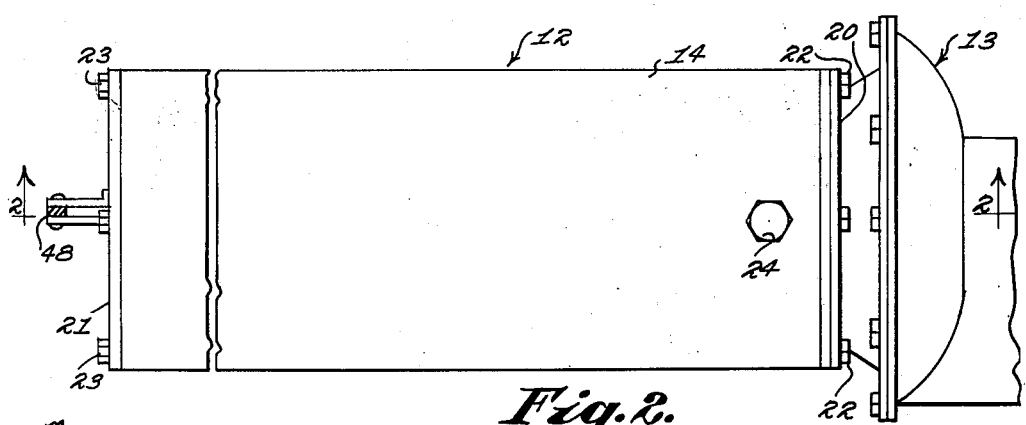
Fig.1.
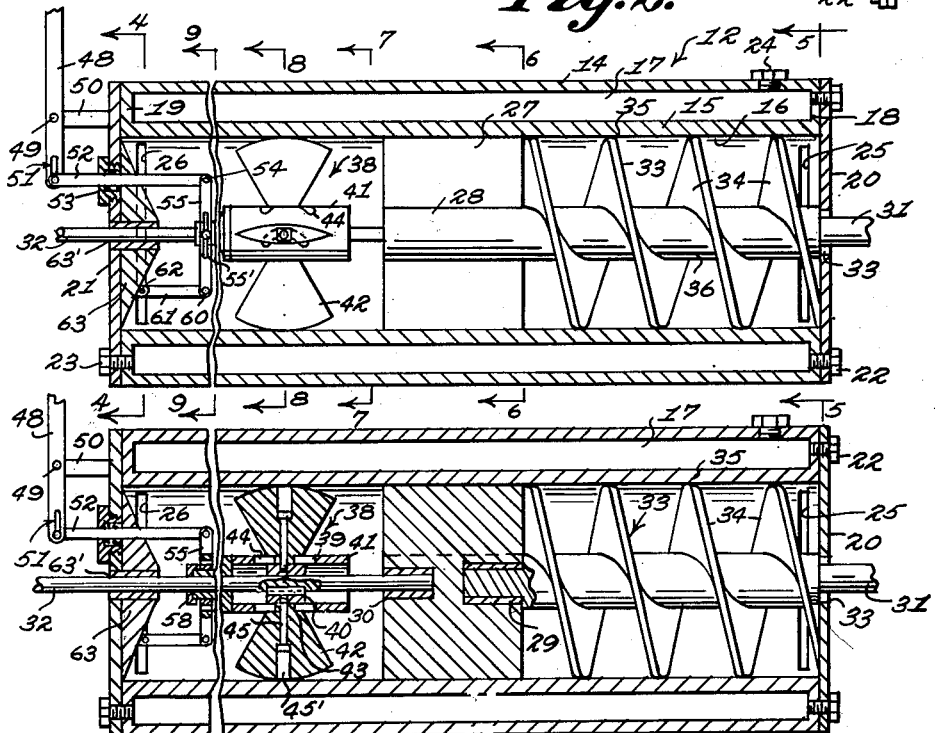
Fig.2.
Fig.3.
INVENTOR.
Roland R. Mosher
BY
McMorrow, Berman & Davidson
ATTORNEYS May 20, 1952     R. R. MOSHER     2,597,527

REVERSIBLE ROTARY FLUID COUPLING

Filed July 13, 1948     2 SHEETS—SHEET 2

INVENTOR.

Roland R. Mosher

BY McMorrow, Berman & Davidson

ATTORNEYS

Patented May 20, 1952

2,597,527

UNITED STATES PATENT OFFICE 2,597,527

REVERSIBLE ROTARY FLUID COUPLING

Roland Robert Mosher, Jackson, Mich.

Application July 13, 1948, Serial No. 38,361

4 Claims. (Cl. 60—54)

1

This invention relates to an improved fluid drive, especially but not exclusively, for automotive vehicles, the primary object of the invention being to provide a simplified and more efficient device of this kind of the type eliminating both the clutch and transmission usually employed, and providing for both forward and reverse drive, and wherein means is incorporated for manually varying the fluid torque coupling between the drive and driven shafts in both forward and reverse drive.

Another important object of the invention is to provide a device of the above indicated character which can be installed in existing motor vehicles and the like in the place of their transmission, pressure plate, and clutch.

Another important object of the invention is to provide a device of the character indicated above, which can be manufactured at relatively low cost, and whose functional components can be varied in form and construction to meet various requirements of size and power, while retaining the essential effectiveness of the device.

Other important objects and advantageous features of the invention will be apparent from the following description and accompanying drawings, wherein, for present purposes of illustration herein, a specific embodiment of the invention is set forth in detail.

In the drawings:

Figure 1 is a top plan view showing the device installed in the rear of a motor vehicle flywheel housing.

Figure 2 is a longitudinal section taken on the line 2—2 of Figure 1.

Figure 3 is a view similar to Figure 2 with certain portions thereof in longitudinal section to disclose further structural details.

Figures 4, 5, 6, 7, 8 and 9 are transverse vertical sections taken on the lines 4—4, 5—5, 6—6, 7—7, 8—8, and 9—9, respectively of Figure 2.

Figure 10:
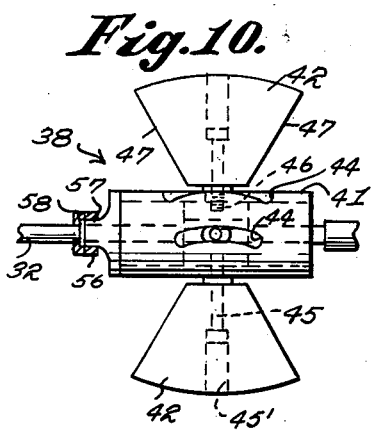
Figure 9:
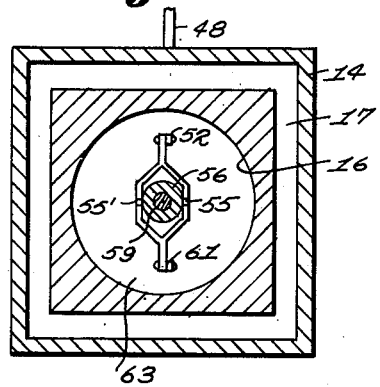

Figure 10 is an enlarged fragmentary side elevation, showing the construction of the driven rotor and the means for feathering or unfeathering the blades thereof for producing forward and reverse drive positions and variations thereof, and neutral position in which there is no effective fluid coupling between the drive and driven rotors.

Referring in detail to the drawings, the illustrated fluid drive unit, generally designated 12, is, as shown in Figure 1, adapted to be bolted onto the rear of the flywheel housing 13 of such as a motor vehicle, with the usual transmission, pressure plate, and clutch removed, the operative

2 connection between the existing flywheel (not shown) and the existing drive shaft (not shown) being made at opposite ends of the unit 12.

The fluid drive unit 12 comprises in this instance a longitudinally elongated square cross-section casing 14, in which is axially supported a square cross-section block 15 having a cylindrical axial bore 16, the exterior surfaces of the block being similarly spaced from corresponding interior wall surfaces of the casing 14 to provide a rectangular fluid space 17 extending the length of the casing. The ends of the casing 14 are closed by walls 18 and 19, and the ends of the bore 16 are closed by plates 20 and 21, bolted to the walls 18 and 19, as indicated at 22 and 23, respectively, in fluid-tight manner. The top of the casing 14 is provided with a filling plug 24 through which hydraulic fluid is introduced into the fluid space 17 and the interior of the bore 16. The bore 16 has communication with the fluid space 17 only through arcuate inlet slots 25 at the front end of the casing 14, and similar arcuate outlet slots 26 at the rear end of the casing 14.

Figure 4:
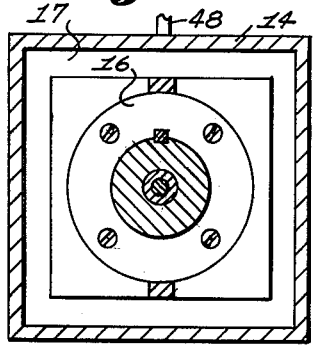
Figure 5:
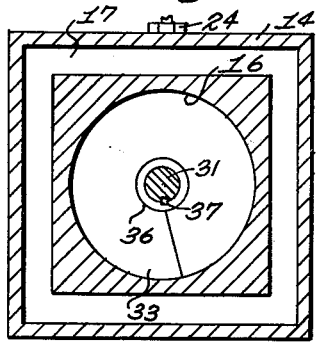
Figure 6:
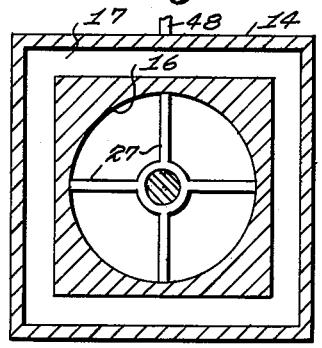

Fixed at a point intermediate the front and rear ends of the bore 16 is a set of guide fins 27, four in this instance, which are of substantial length, as shown in Figures 2 and 3, and are equally circumferentially spaced, as shown in Figure 6, the vanes 27 being plane with the vanes paired in the same diametrical planes. The vanes 27 radiate from a hub 28 recessed at opposite ends to accommodate front and rear bearings 29 and 30 for the adjacent ends of the front or drive shaft 31 and rear or driven shaft 32.

The front end casing plate 20 is provided with a fluid-sealed bearing 33 for the front end of the drive shaft 31. The forward end of the drive shaft 31 terminates in a suitable drive connection (not shown) with the flywheel (not shown) within the flywheel housing 13.

On the drive shaft 31 and occupying the space within the bore 16 between the plate 20 and the forward edges of the stationary guide vanes 27 is the drive rotor in the form of a screw or worm 33 having relatively large, axially-spaced helices 34 whose outer edges 35 run close to the wall of the bore 16. The hub 36 of the worm 33 is keyed, as indicated at 37 in Figure 5, to the drive shaft 31.

In the space in the bore 16 behind the guide vanes 27 is located the driven rotor 38 which comprises a hub 39, keyed to the driven shaft 32 at 40, on which is slidably mounted a sleeve 41 for axial movement. Radiating from the hub 39 are blades 42, terminating at their radially inward ends in stems or cam followers 43 slidably positioned in longitudinally covered cam slots 44 formed through the sleeve 41. The blades 42 are removably mounted on the hub 39 by studs 45 located in deep counterbores 45' opening through the outer ends of the blades and passing through the blades and threaded at their radially inward ends into the hub 39, as indicated at 46, the remainder of the studs being smooth, so that the blades can turn thereon.

Figure 7:
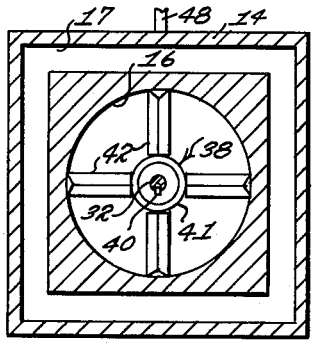
Figure 8:
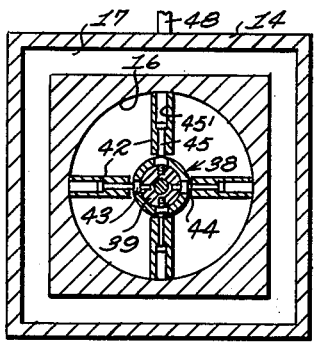

The blades 42 are fan-shaped and have an elliptical cross-section, as shown in Figure 2, the side edges 47 being relatively sharp, and in the neutral position of the blades shown in Figures 2 and 7, the blades are positioned in planes passing through the axis of the driven shaft 32.

Manual means, controllable from the driver's seat, in the case of a motor vehicle, comprises a vertical lever 48 pivoted at 49 on a lug 50 on the upper part of the rear casing plate 21, whose lower end has a pin and slot connection 51 with the rear end of a horizontal link rod 52 which slides longitudinally through a seal bearing 53 in the plate 21 and is pivoted at its forward end at 54 with the upper arm of a yoke or frame 55 straddling an idler bearing sleeve 56 confined on a reduced portion 57 on the rear end of the sleeve 41, as shown in Figures 3 and 11, between a fixed annulus 58 on the rear end of the portion 57 and the rear end of the sleeve proper. The lower arm of the frame or yoke 55 is pivoted at 60 to the forward end of a link 61, whose rear end is pivoted at 62 to the rear casing plate 21. The sides of the yoke 55 have pin and slot connections 55' with opposite sides of the bearing 56.

On the forward side of the rear casing plate 21 is a frustro-conical fluid distributor 63 which is concentric with the bore 16 and operates to evenly and positively direct the fluid toward the fluid outlet slots 26 at the rear end of the bore 16, the fluid moved rearwardly in the bore 16 as a result of rotation of the drive rotor. The driven shaft 32 passes through a seal bearing 63' in the plate 21 and distributor 63.

When the cam sleeve 41 is moved rearwardly from intermediate or neutral position by forwardly tilting the lever 48, the blades 42 are turned on the studs 45 and pivoted out of neutral position into forward drive position. When the sleeve 41 is moved forwardly out of neutral position, the blades 42 are pivoted into reverse drive position.

In operation, when the vehicle or other engine is operating and thereby turns the drive rotor shaft 31, the worm 33 forces fluid in the bore 16 in a rearward direction through the guide vanes 27, whereby the motion of the fluid is converted from spiral to rectilinear as it passes rearwardly, through the guide vanes. If the blades 42 of the driven rotor 38 are in neutral position the fluid emerging from the guide vanes 27 has no driving effect upon the driven rotor. However, if the blades 42 of the driven rotor 38 are pivoted in either forward or reverse drive positions, the driven rotor 38 and hence the driven rotor shaft 32 will be turned in a corresponding direction.

Assuming that the driving engine is rotating the drive rotor 33 with sufficient power and speed to build up a forceful rearward movement of the fluid present in the bore 16 so as to circulate the fluid forcibly from the front slots 25 to the rear slots 26, via the guide vanes 27 and the driven rotor 38 against the blades 42 thereof while in another than neutral position, the resultant fluid torque between the drive rotor 33 and the driven rotor 38 may be manually varied through a considerable range by increasing and decreasing the pitch of the driven rotor plates 42 by manipulating the control lever 48.

What is claimed is:

1. In a fluid coupling, a tubular casing having closed ends, a block mounted on the casing ends and extending longitudinally between the ends of the casing in spaced relation to the sidewall of the casing to define a fluid space surrounding said block, said block being formed with a longitudinal cylindrical bore closed by the casing ends, inlet and outlet slots opening through the sides of said block at its opposite ends providing sole communication between said fluid space and said bore, hydraulic fluid in said space and in said bore, a fixed vane assembly in said bore at a point intermediate the ends of said bore, said assembly comprising radial longitudinally extending plates of relatively great length, a driving shaft journalled through one end of said casing and extending inwardly in said bore toward said vane assembly, a spiral screw fixed on said driving shaft within said bore and extending between the said one end of the casing to said vane assembly, said screw being spiralled in a direction to draw fluid from said space into the bore through the inlet slots and force the fluid in said bore toward and through said vane assembly when the driving shaft is rotated in a predetermined direction, the vane assembly then serving to convert the rotary motion of the fluid forced therethrough by said screw into rectilinear motion, a driven shaft journalled through the opposite end of the casing and extending in said bore toward said vane assembly, a driven rotor fixed on said driven shaft in axially spaced relation to said vane assembly and the adjacent end of the casing, said driven rotor comprising a plurality of radial blades mounted on said driven shaft for pivotal movement on their axes from neutral to forward drive and reverse drive positions, and manual means extending through said casing and connected to said blades for turning said blades on their axes.

2. In a fluid coupling, tubular casing having closed ends, a block mounted on the casing ends and extending longitudinally between the ends of the casing in spaced relation to the sidewall of the casing to define a fluid space surrounding said block, said block being formed with a longitudinal cylindrical bore closed by the casing ends, inlet and outlet slots opening through the sides of said block at its opposite ends providing sole communication between said fluid space and said bore, hydraulic fluid in said space and in said bore, a fixed vane assembly in said bore at a point intermediate the ends of said bore, said assembly comprising radial longitudinally extending plates of relatively great length, a driving shaft journalled through one end of said casing and extending inwardly in said bore toward said vane assembly, a spiral screw fixed on said driving shaft within said bore and extending between the said one end of the casing to said vane assembly, said screw being spiralled in a direction to draw fluid from said space into the bore through the inlet slots and force the fluid in said bore toward and through said vane assembly when the driving shaft is rotated in a predetermined direction, the vane assembly then serving to convert the rotary motion of the fluid forced therethrough by said screw into rectilinear motion, a driven shaft journalled through the opposite end of the casing and extending in said bore toward said vane assembly, a driven rotor fixed on said driven shaft in axially spaced relation to said vane assembly and the adjacent end of the casing, said driven rotor comprising a plurality of radial blades mounted on said driven shaft for pivotal movement on their axis from neutral to forward drive and reverse drive positions, and manual means extending through said casing and connected to said blades for turning said blades on their axes, the axially inward ends of said driving and driven shafts being supportably journalled in opposite ends of said fixed vane assembly.

3. In a fluid coupling, a tubular casing having closed ends, a block mounted on the casing ends and extending longitudinally between the ends of the casing in spaced relation to the sidewall of the casing to define a fluid space surrounding said block, said block being formed with a longitudinal cylindrical bore closed by the casing ends, inlet and outlet slots opening through the sides of said block at its opposite ends providing sole communication between said fluid space and said bore, hydraulic fluid in said space and in said bore, a fixed vane assembly in said bore at a point intermediate the ends of said bore, said assembly comprising radial longitudinally extending plates of relatively great length, a driving shaft journalled through one end of said casing and extending inwardly in said bore toward said vane assembly, a spiral screw fixed on said driving shaft within said bore and extending between the said one end of the casing to said vane assembly, said screw being spiralled in a direction to draw fluid from said space into the bore through the inlet slots and force the fluid in said bore toward and through said vane assembly when the driving shaft is rotated in a predetermined direction, the vane assembly then serving to convert the rotary motion of the fluid forced therethrough by said screw into rectilinear motion, a driven shaft journalled through the opposite end of the casing and extending in said bore toward said vane assembly, a driven rotor fixed on said driven shaft in axially spaced relation to said vane assembly and the adjacent end of the casing, said driven rotor comprising a plurality of radial blades mounted on said driven shaft for pivotal movement on their axis from neutral to forward drive and reverse drive positions, and manual means extending through said casing and connected to said blades for turning said blades on their axes, said driven shaft having thereon a hollow axial sleeve larger in diameter than and concentrically spaced from said driven shaft, a hub fixed on said driven shaft within said sleeve and supporting said sleeve for movement in opposite directions relative to the driven shaft, said blades having stems pivotally secured to said hub, said sleeve being formed with arcuate slots through which said stems extend, said manual means comprising endwise movable rod means extending through the adjacent end of the casing and connected to said sleeve.

4. In a fluid coupling, a tubular casing having closed ends, a block mounted on the casing ends and extending longitudinally between the ends of the casing in spaced relation to the sidewall of the casing to define a fluid space surrounding said block, said block being formed with a longitudinal cylindrical bore closed by the casing ends, inlet and outlet slots opening through the sides of said block at its opposite ends providing sole communication between said fluid space and said bore, hydraulic fluid in said space and in said bore, a fixed vane assembly in said bore at a point intermediate the ends of said bore, said assembly comprising radial longitudinally extending plates of relatively great length, a driving shaft journalled through one end of said casing and extending inwardly in said bore toward said vane assembly, a spiral screw fixed on said driving shaft within said bore and extending between the said one end of the casing to said vane assembly, said screw being spiralled in a direction to draw fluid from said space into the bore through the inlet slots and force the fluid in said bore toward and through said vane assembly when the driving shaft is rotated in a predetermined direction, the vane assembly then serving to convert the rotary motion of the fluid forced therethrough by said screw into rectilinear motion, a driven shaft journalled through the opposite end of the casing and extending in said bore toward said vane assembly, a driven rotor fixed on said driven shaft in axially spaced relation to said vane assembly and the adjacent end of the casing, said driven rotor comprising a plurality of radial blades mounted on said driven shaft for pivotal movement on their axis from neutral to forward drive and reverse drive positions, and manual means extending through said casing and connected to said blades for turning said blades on their axes, a distributing cone on the said opposite end of the casing within said bore, said cone being axially aligned with said bore for centrifugally distributing to the outlet slots the fluid passing said rotor toward said opposite end of the casing.

ROLAND ROBERT MOSHER.

REFERENCES CITED

The following references are of record in the file of this patent:

UNITED STATES PATENTS

| Number | Name | Date |
|---|---|---|
| 1,095,132 | Thomson | Apr. 28, 1914 |
| 1,144,214 | Lake et al. | June 22, 1915 |
| 1,304,566 | Hornbrook | May 27, 1919 |
| 1,860,576 | Graupner | May 31, 1932 |
| 1,993,741 | Jandasek | Mar. 12, 1935 |
| 2,002,760 | Wilson | May 28, 1935 |
| 2,248,769 | Manley | July 8, 1941 |
| 2,357,654 | Horton | Sept. 5, 1944 |
| 2,382,034 | Wemp | Aug. 14, 1945 |
| 2,427,458 | Jandasek | Sept. 16, 1947 |
| 2,533,148 | Spiegel | Dec. 5, 1950 |